(12) United States Patent
Medapalli

(10) Patent No.: US 8,125,958 B2
(45) Date of Patent: Feb. 28, 2012

(54) WIRELESS SUBSCRIBER INTER-TECHNOLOGY HANDOFF

(75) Inventor: Kameswara Medapalli, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 384 days.

(21) Appl. No.: 12/454,996

(22) Filed: May 26, 2009

(65) Prior Publication Data

US 2009/0310562 A1    Dec. 17, 2009

Related U.S. Application Data

(60) Provisional application No. 61/132,363, filed on Jun. 17, 2008.

(51) Int. Cl.
*H04Q 7/20*    (2006.01)
*H04Q 7/00*    (2006.01)
*H04W 4/00*    (2009.01)

(52) U.S. Cl. .................. 370/331; 370/466; 455/436

(58) Field of Classification Search .......... 370/331–338, 370/466–469; 455/436–450, 452.2, 561; 702/190
See application file for complete search history.

(56) References Cited

U.S. PATENT DOCUMENTS 5,715,240 A * 2/1998 Borras et al. .................. 370/252

(Continued)

*Primary Examiner* — Afsar M. Qureshi
(74) *Attorney, Agent, or Firm* — Sterne, Kessler, Goldstein & Fox P.L.L.C.

(57) ABSTRACT

Embodiments for a method and apparatus of a wireless subscriber unit triggering an inter-technology handoff are disclosed. One method includes estimating a signal quality of first technology communication signals received from a serving base station. Information of neighboring base stations is received from the serving base station. Based on the information of the neighboring base stations, a signal quality of first technology communication signals received from each of the neighboring base stations is estimated. An inter-technology handoff is triggered based on a function of the signal quality of communication signals received from a serving base station and the signal quality of communication signals received from each of the neighboring base stations.

20 Claims, 8 Drawing Sheets

U.S. PATENT DOCUMENTS

| | | | |
|---|---|---|---|
| 2004/0059547 A1* | 3/2004 | Aftelak | 702/190 |
| 2005/0025182 A1* | 2/2005 | Nazari | 370/469 |
| 2008/0108367 A1* | 5/2008 | Afrashteh et al. | 455/452.2 |
| 2008/0175200 A1 | 7/2008 | Stammers et al. | |
| 2008/0176568 A1* | 7/2008 | Palanki et al. | 455/436 |
| 2008/0318575 A1* | 12/2008 | Ulupinar et al. | 455/436 |

* cited by examiner

WIRELESS SUBSCRIBER INTER-TECHNOLOGY HANDOFF

RELATED APPLICATIONS

This patent application claims priority to U.S. Provisional Application No. 61/132,363, filed Jun. 17, 2008, and herein incorporated by reference.

FIELD OF THE DESCRIBED EMBODIMENTS

The described embodiments relate generally to wireless communications. More particularly, the described embodiments relate to wireless subscriber inter-technology handoff.

BACKGROUND

FIG. 1 shows two different technology wireless systems that provide overlapping coverage. That is, a wireless subscriber 110 can in some locations (such as, 120, 122, 124) simultaneously receive wireless communication signals from both of the technology types. In other locations (such as, 121, 123, 125) the wireless subscriber 110 can only receive wireless communication signals from a single one of the technology type. When more than one type of wireless technology communication signals are available, the wireless subscriber 110 desirably selects reception of the type of wireless technology signal that provides a user of the wireless subscriber 110 with the best experience.

Exemplary technology types include WiMAX (Worldwide Interoperability for Microwave Access) and CDMA (Code Division Multiple Access). For these exemplary technology types, situations can exist in which one type of technology may be more desirable for a uses of the wireless subscriber 110. For example, CDMA wireless signals may be more wide spread in deployment, and therefore, more commonly received by the wireless subscriber 110. However, the WiMAX wireless signals may provide substantially wider bandwidth (greater throughput), and therefore, be the better choice of the two technology types for reception when available. The wireless subscriber can receive WiMAX signals when available, and then receive CDMA signals when only CDMA signals are available.

In order to receive a wireless communication signal, a wireless subscriber must include a radio that is adapted for the technology type of the wireless communication signal. For example, a WiMAX radio is required to receive WiMAX signals, and a CDMA radio is required to receive CDMA signals. Each of the radios, however, require power for operation.

Mobile subscribers are typically battery operated, and it is desirable to minimize the power required by the mobile subscribers to operate. Therefore, it is desirable to minimize the number of radios within a mobile subscriber that are operational. That is, for example, for mobile subscribers that include both WiMAX and CDMA radios, it is desirable to minimize the amount of time in which both radios are operating.

Present wireless handoffs between different wireless technologies are network controlled. That is, a mobile subscriber receives protocol messages from the network indicating that a technology handoff is to occur. The methodologies generally include make-before-break handoffs. More specifically, the mobile subscriber must establish a link (connection) to one technology type while maintaining link (connection) to another technology type. As previously described, simultaneous connections to different types of wireless technologies requires multiple radios of the mobile subscriber to be operational, requiring excessive power dissipation by the mobile subscriber.

It is desirable to a wireless subscriber and a method of operating the wireless subscriber that provides an inter-technology selection and handoff while minimizing power consumption of the wireless subscriber, and minimizing the latency between wireless connections using the different types of wireless technologies.

SUMMARY

An embodiment includes a method of a wireless subscriber unit triggering an inter-technology handoff. A signal quality of first technology communication signals received from a serving base station is estimated. Information of neighboring base stations is received from the serving base station. Based on the information of the neighboring base stations, a signal quality of first technology communication signals received from each of the neighboring base stations is estimated. An inter-technology handoff is triggered based on a function of the signal quality of communication signals received from a serving base station and the signal quality of communication signals received from each of the neighboring base stations.

Another embodiment includes a wireless subscriber. The wireless subscriber includes a first wireless technology radio for receiving first technology communication signals, and a second wireless technology radio for receiving second technology communication signals. A controller estimates a signal quality of first technology communication signals received from a serving base station. The controller receives information of neighboring base stations from the serving base station, and based on the information of the neighboring base stations, the controller estimates a signal quality of first technology communication signals received from each of the neighboring base stations. An inter-technology handoff is triggered based on a function of the signal quality of communication signals received from a serving base station and the signal quality of communication signals received from each of the neighboring base stations.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods and apparatuses for controlling a wireless inter-technology handoff of a mobile subscriber. The mobile subscriber can make the handoff autonomously (that is, without network control). The control provides for handoffs between types of wireless technologies in which the timing of deactivation of one technology is coordinated in time with activation of another technology. The coordination attempts to control the amount of time overlap between the technologies, to allow for minimization of power consumed by wireless subscribers that includes radios that provide for communications using the different wireless communication technologies.

Figure 1:
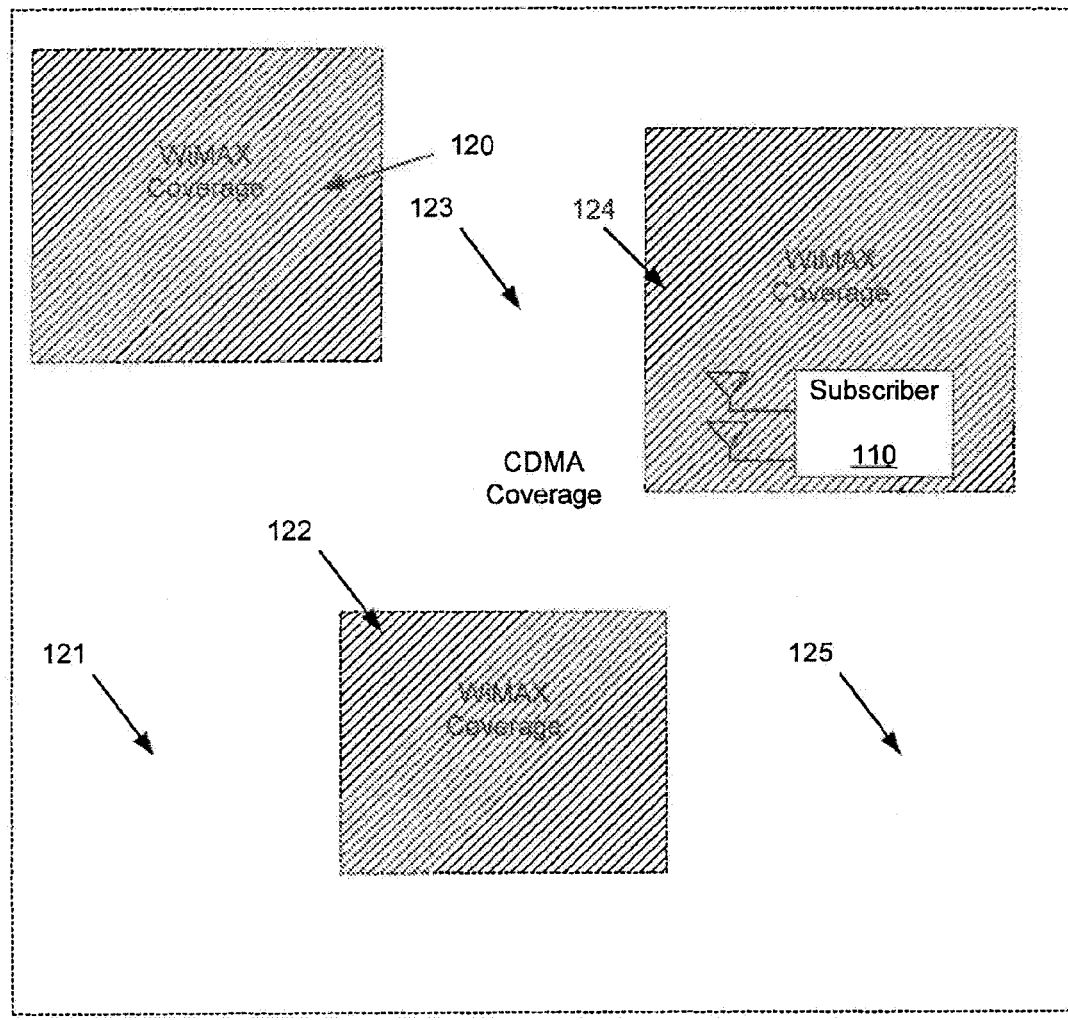
FIG. 1 shows an area that includes at least some wireless coverage by more than one type of wireless communications technology.
Figure 2:
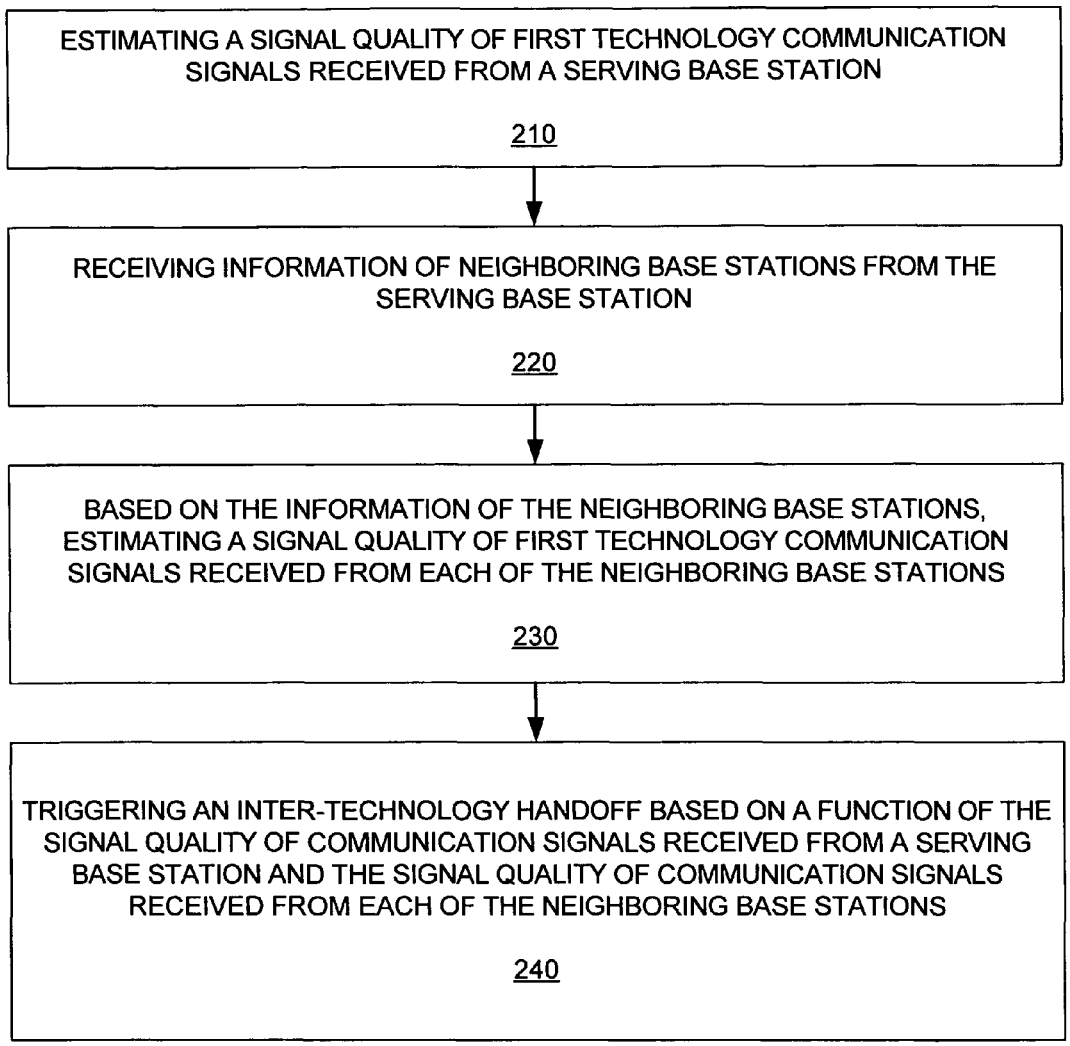
FIG. 2 shows a flow chart of step of an example of a method of a wireless subscriber unit triggering an inter-technology handoff.

FIG. 2 shows a flow chart of step of an example of a method of a wireless subscriber unit triggering an inter-technology handoff. A first step 210 includes estimating a signal quality of first technology communication signals received from a serving base station. A second step 220 includes receiving information of neighboring base stations from the serving base station. A third step 230 includes based on the information of the neighboring base stations, estimating a signal quality of first technology communication signals received from each of the neighboring base stations. A fourth step 240 includes triggering an inter-technology handoff based on a function of the signal quality of communication signals received from a serving base station and the signal quality of communication signals received from each of the neighboring base stations.

The first technology communication signals can be, for example, WiMAX communication signals. The second technology communication signals can be, for example, CDMA communication signals. It is to be understood, however, that the first and second technology communication signals are not limited to any particular technology signals or any particular handoff sequence.

For an embodiment, triggering an inter-technology handoff based a function of the signal quality of communication signals received from a serving base station and the signal quality of communication signals received from each of the neighboring base stations includes triggering the inter-technology handoff if the signal quality of communication signals received from a serving base station and the signal quality of communication signals received from each of the neighboring base stations, all fall below a predetermined threshold. That is, the wireless subscriber monitors the signal quality of first technology communication signals received from the serving base station, and the wireless subscriber monitors the signal quality of first technology communications signals received from each of the neighboring base stations. For this embodiment, if the signal quality of all of the first technology communication signals fall below a signal quality threshold, the technology handoff is triggered. This embodiment evaluates the signal quality of the serving base station and the neighboring base stations to ensure that the wireless subscriber is not going to merely execute a wireless handoff from the serving base station to one of the neighboring base stations. That is, the subscriber evaluates whether a technology handoff is required to maintain a wireless connection because all base stations that can provide first technology wireless communication will no longer be available. The inter-technology handoff assumes that second technology wireless communication signals are available.

The signal quality of the communication signals can be characterized by, for example, the CINR (carrier to interference and noise ratio) or RSSI (received signal strength indicator) of the communication signals.

An embodiment includes the communication signals being multi-carrier signals, for example, OFDM (Orthogonal Frequency-Division Multiplexing) signals. Additionally, the estimated signal quality of the communication signals can include averaging of a CINR of each of the sub-carriers of the received communication signals. For one embodiment, the CINR of the sub-carriers are averaged over frequency of a single multi-carrier symbol of the received communication signals. For another embodiment, the CINR of the sub-carriers are averaged over time for multiple multi-carrier symbols of the received communication signals. For another embodiment, the CINR of the sub-carriers are averaged over at least one of time and frequency for multiple multi-carrier symbols received over spatially separate antennas of the wireless subscriber.

When the wireless subscriber triggers the inter-technology handoff, it means that the wireless subscriber has detected that it is about to lose the capability to receive the first technology wireless signals, and should therefore, initiate receiving the second technology wireless signals. As such, an embodiment includes the wireless subscriber de-activating a first technology radio if the inter-technology handoff is triggered.

To minimize the amount of time in which the radios of the different technologies are simultaneously operating, the timing of the deactivation of the first technology radio can be controlled with respect to activation of the second technology radio. An embodiment includes estimating a time (t) of how much longer first technology communication signals can be received when the inter-technology handoff is triggered. This embodiment further includes the wireless subscriber activating a second technology radio within the estimated time (t). The estimated time (t) can be dependent upon a value of the predetermined threshold. As will be described, an embodiment includes estimating the time (t) based on a signal quality of the first technology wireless signals (from both the serving base station and the neighboring base stations) falling below the predetermined threshold. For an embodiment, the estimated time (t) is determined by accessing a look up table, wherein values within the look up table are based upon an averaging parameter used for averaging the signal quality of received signals. The look up table can be generated by prior experimentation and simulation.

As will be described and shown, an embodiment includes a connection manager controlling de-activation of a first technology radio, and controlling activation of a second technology radio, where timing of the de-activation and the activation is controllable by the connection manager depending upon an amount of expected time the first technology signals can be received, and upon a time required by the second technology radio to scan for second technology wireless communication signals. The control manager can be included within the wireless subscriber, or the control manager can be included within a separate unit that interfaces with the wireless subscriber.

As mentioned, the time required by the second technology radio to scan for the second technology wireless signals is estimated. The estimate can be influenced by determining how long it has been since second technology wireless communication signals were last received by the wireless subscriber. More specifically, the estimate can be influenced by how long ago specific carrier frequencies of the second technology were most recently used. If it has been a long enough time since second technology wireless communication signals were last received, the wireless subscriber may need to execute a "cold scan". However, if recently received, then the wireless subscriber is more likely to be able to acquire the most recent received carrier frequencies. Therefore, the time for the second technology to scan can be correspondingly larger or small depending upon how recently how recently the wireless subscriber received second technology signals.

As described, the estimated time (t) reflects an estimate of how much longer the wireless subscriber can receive first technology communication signals after the handoff trigger. Also as described, one embodiment includes the estimate (t) being based on received first technology wireless signals having a signal quality falling below a predetermined threshold—which causes the trigger. Movement of the wireless subscriber can influence the amount of time the wireless subscriber can receive first technology signals after the received signals fall below the predetermined threshold. One embodiment includes the predetermined threshold being adaptively selected based upon movement of the wireless subscriber. The movement of the subscriber can be estimated, for example, based upon a Doppler shift of the wireless subscriber.

Figure 3:
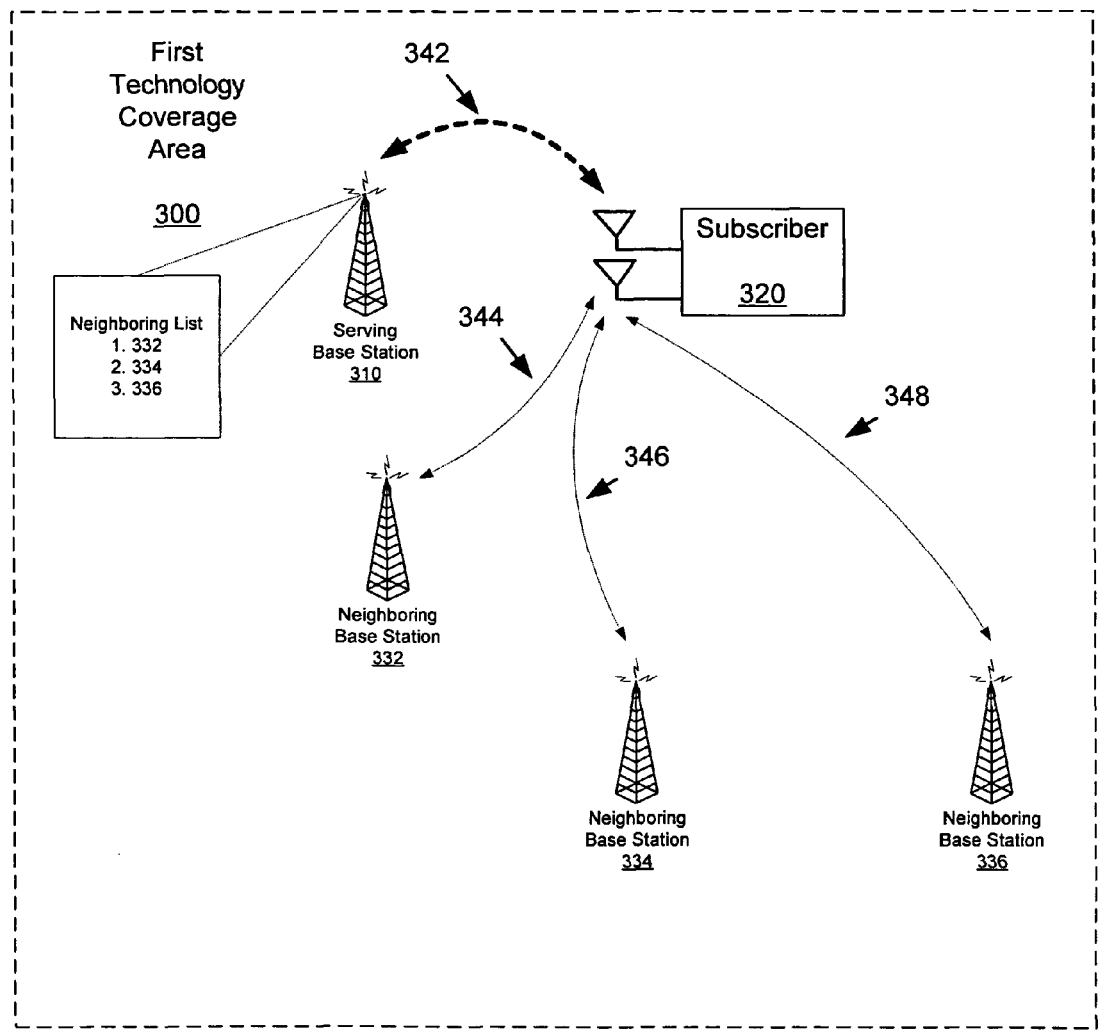
FIG. 3 shows an example of a first wireless technology base station communicating with a subscriber, and neighboring first technology base stations.

FIG. 3 shows an example of a first wireless technology base station 310 communicating with a subscriber 320, and also shows neighboring first technology base stations 332, 334, 336. The subscriber 320 obtains a list of the neighboring base stations 332, 334, 336 from the serving base station which maintains a neighboring base station list. Generally, the serving base station 310 is the base station that the subscriber 320 is presently maintaining wireless communication. The neighboring base stations 332, 334, 336 are proximate base stations that the subscriber 320 may handoff to if, for example, the subscriber 320 moves to a different physical location.

The subscriber 320 monitors the signal quality of wireless signals received from the serving base station 310 (through wireless link 342). Additionally, the subscriber can monitor the signal quality of wireless signals received from the neighboring base stations 332, 334, 336 (through wireless links 344, 346, 348). Based on the signal quality of the first technology wireless signals received from all of the base stations 310, 332, 334, 336, the subscriber 320 can determined if an inter-technology handoff should be triggered.

It is desirable for the subscriber to evaluate the signal quality of not only just the serving base station 310 in determination of whether an inter-technology handoff should be initiated. That is, if only the signal quality of the serving base station is evaluated in determination of an inter-technology handoff, same-technology handoffs may not be properly identified or evaluated.

Generally, the base stations are each physically fixed to a particular geographical location. Therefore, each base station can have prior knowledge of its neighboring base stations. Clearly, the neighboring base station list can change as new base stations are added or old base stations are removed.

Figure 4A:
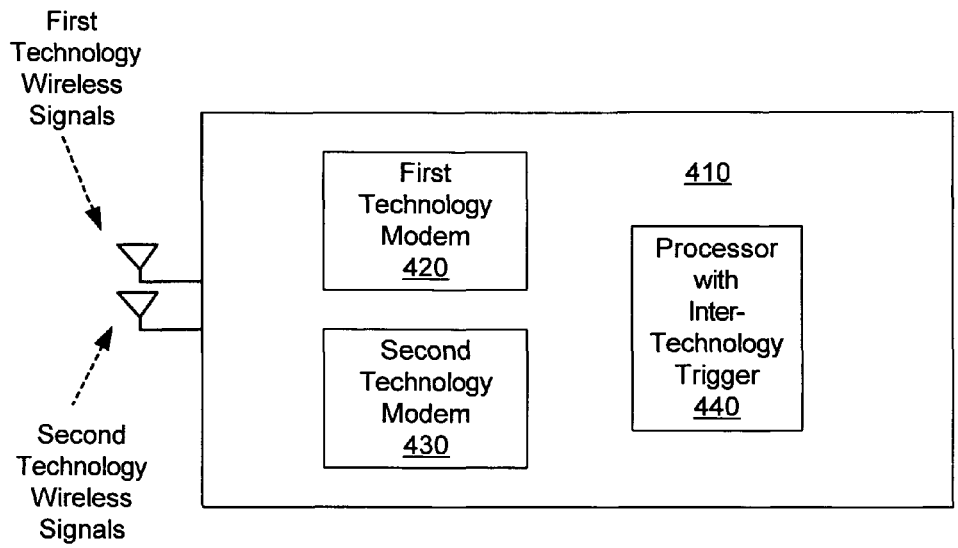
FIG. 4A shows an example of a wireless subscriber unit that can receive communication signals using more than one type of wireless technology.

FIG. 4A shows an example of a wireless subscriber unit 410 that can receive communication signals using more than one type of wireless technology (for example, WiMAX and CDMA). The wireless subscriber unit 410 includes at least a first modem 420 and a second modem 430, enabling the wireless subscriber unit 410 to receive and transmit communication signals according to the different technology types. The modems 420, 430 can include corresponding technology type radios, and control circuitry. For this embodiment, the technology handoff trigger is included within the wireless subscriber 410. An embodiment includes the technology handoff trigger processing being included within the modems 420, 430. Another embodiment includes the technology handoff trigger processing being included within a processor 440 located within the subscriber 410, but not necessarily within the modems 420, 430.

Figure 4B:
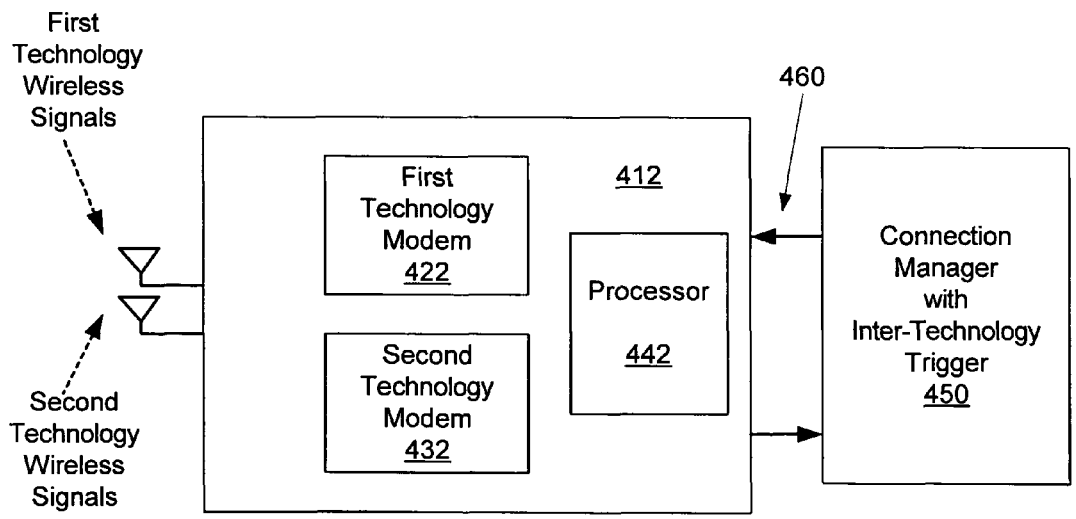
FIG. 4B shows another example of a wireless subscriber unit that can receive communication signals using more than one type of wireless technology.

FIG. 4B shows another example of a wireless subscriber unit 412 that can receive communication signals using more than one type of wireless technology. For this embodiment, at least a portion of the technology handoff trigger processing is located external to the subscriber unit 412. The subscriber unit 412 is connected through an interface 460 to an external processing unit 450. The interface 460 can be, for example, a USB (Universal Serial Bus), and the processing unit 450 can be, for example, a laptop computer. The subscriber unit 412 can include modems 422, 432 and a processor 442.

Figure 5:
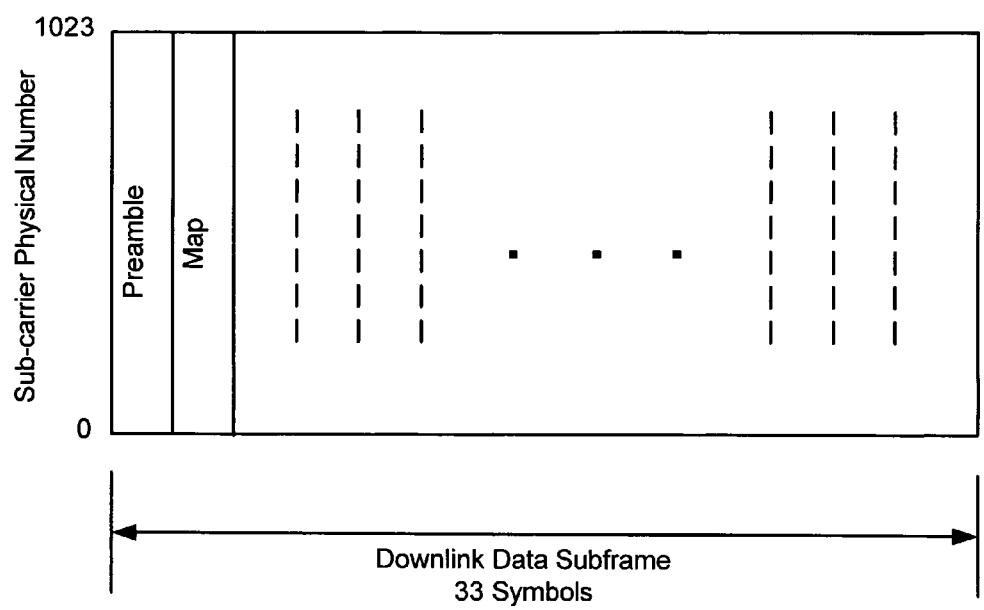
FIG. 5 shows an exemplary downlink subframe that includes multi-carrier symbols.

FIG. 5 shows an exemplary downlink subframe that includes multi-carrier symbols. This embodiment of a downlink subframe can include 33 multi-carrier symbols (29 data symbols) wherein each multi-carrier symbol includes 1024 sub-carriers (700 data sub-carriers). As described, the signal quality of received signals (from the serving base station and/or neighboring base stations) can include averaging a signal quality of each of the sub-carriers. The averaging can include sub-carriers averaged over frequency, or multi-carriers of multiple symbols (that is, averaged over time). Additionally, a multi-antenna subscriber can received multiple spatially separate multi-carrier signals. The signal quality averaging over multiple carriers can additionally or alternatively include averaging of sub-carriers from the spatially separate signals.

Figure 6:
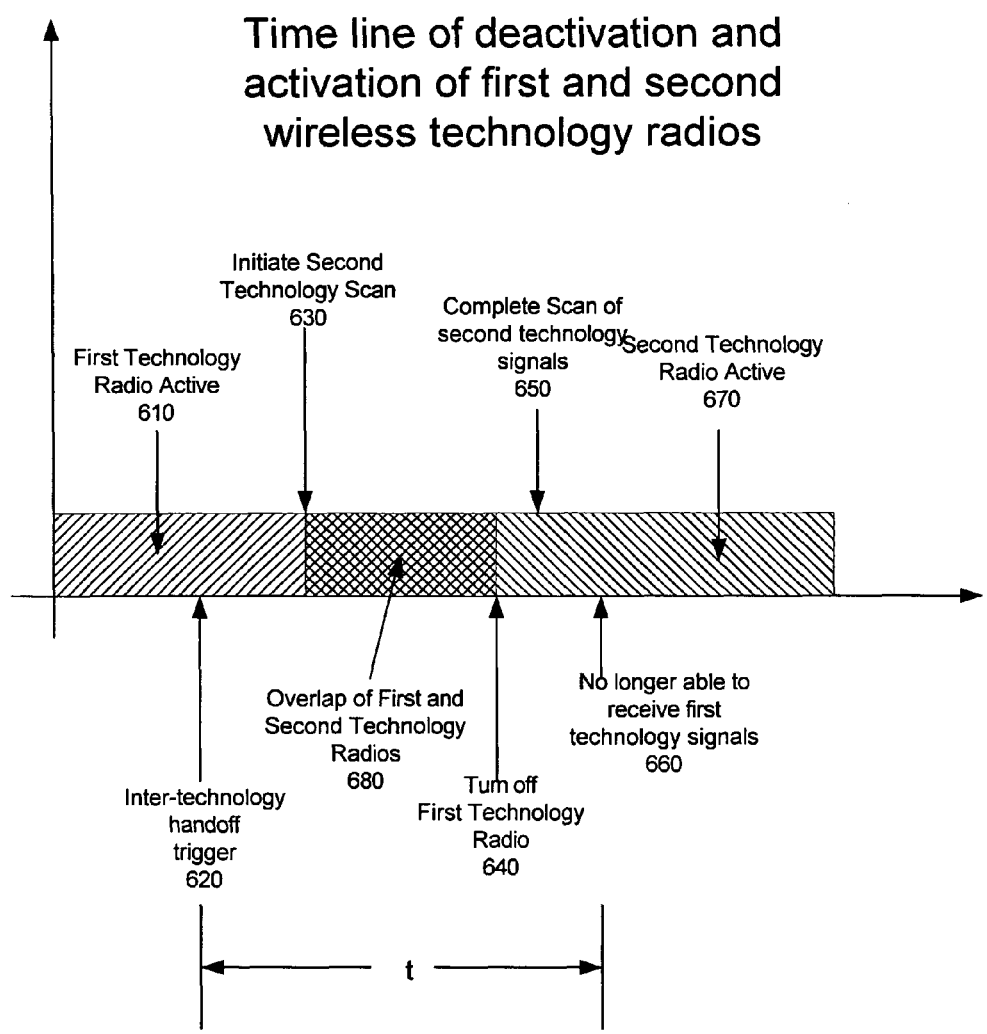
FIG. 6 shows a time-line of an example of a de-activating and activating different wireless communication technologies.

FIG. 6 shows a time-line of an example of the timing de-activating and activating different wireless communication technologies. A first portion 610 of the time line shows where a first technology radio of the subscriber is active. An inter-technology handoff 620 is triggered by the subscriber when the conditions of the first technology signals fall below a predetermined threshold. At some point after the trigger 620, the second technology radio is turned to so that a second wireless technology scan 630 can be initiated. Until the first technology radio is turned off 640, a portion of operation 680 exists in which both the first technology radio and the second technology radio are turned on. The second radio completes its scan 650, and the subscriber then communicates with a second technology base station while the second radio is turn on 670. The previously described time (t) can be observed on FIG. 6 as the time between the trigger 620 and the projected time 660 at which the first technology signal cannot be received by the subscriber.

FIG. 6 shows the portion 680 in which radios within the subscriber of both wireless technology types are turned on. It is desirable to minimize this portion of time to reduce power consumption of the subscriber. However, this portion of time should be long enough to allow the second technology to be active long enough to minimally impact the latency between the subscriber communicating using the different available wireless technologies.

Figure 7:
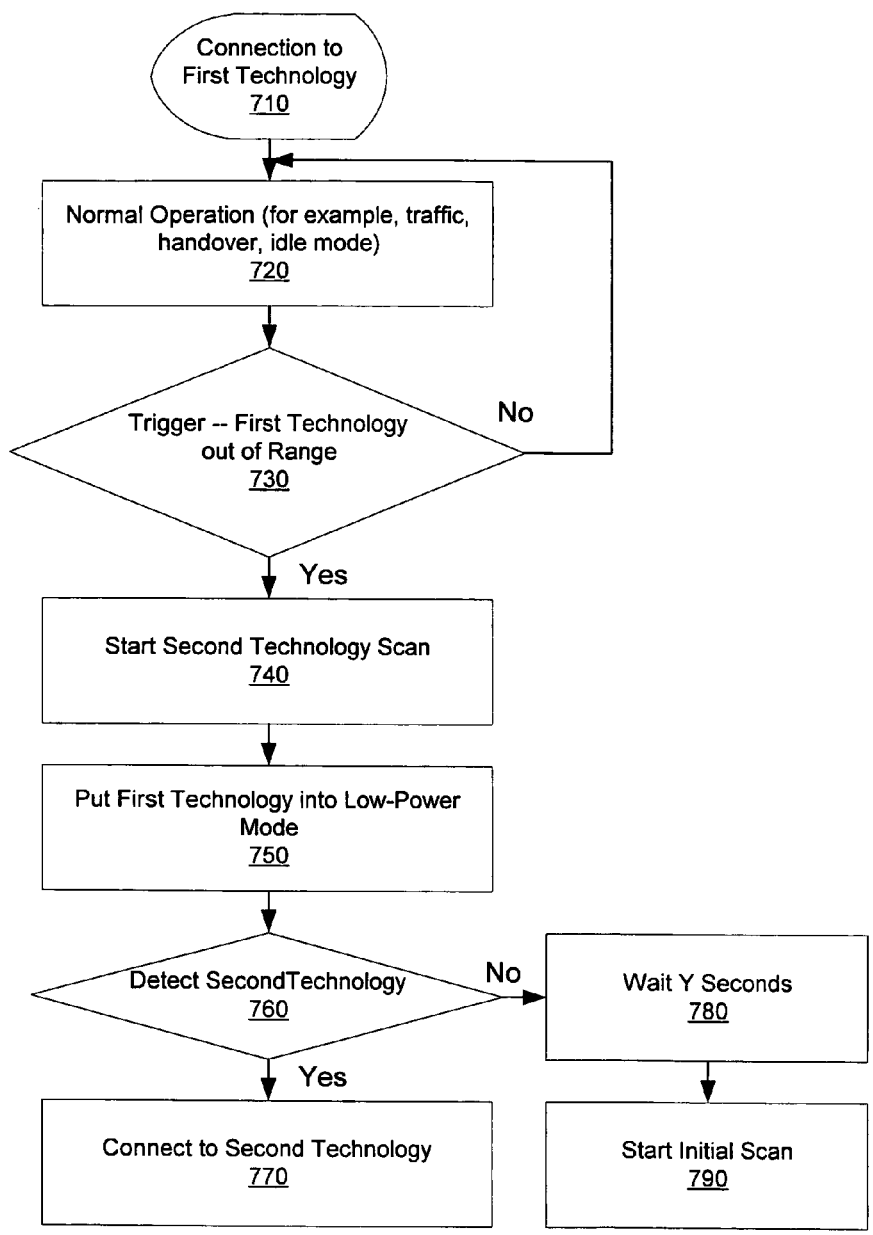
FIG. 7 is a flow chart that includes the steps of an example of a WiMAX to CDMA technology handoff.

FIG. 7 is a flow chart that includes the steps of an example of a method of a mobile subscriber managing a handoff from a first technology wireless communication signal (for example, WiMAX) to second technology wireless communication signals (for example, CDMA). A first step 710 includes the mobile subscriber maintaining a wireless connection with, for example, a base station using the first technology. A second step 720 includes normal wireless communications, such as, data traffic communications, handoffs and/or idle mode connections. A third step 730 includes initiating the inter-technology handoff trigger if, for example, first technology wireless coverage is lost. A fourth step 740 includes initiating scanning of the second technology wireless signals if first technology wireless coverage (reception) is lost (below a threshold). A fifth step 750 includes initiating a power-down of the first technology radio—that is, the subscriber enters a low-power state by, for example, deactivating a first technology radio. A sixth step 760 includes detecting the availability of the second technology wireless signals by, for example, determining that a function of the received signal strength of the second technology wireless signal are above a threshold. A seventh step 770 includes the wireless subscriber connecting to, for example, a base station of the second technology if the second technology wireless signals are of high enough quality. An eighth step 780 includes waiting for Y (a predetermined wait cycle) before executing a ninth step 790 that includes initiating a second technology scan to determine whether the wireless subscriber is still out of second technology ranges. Steps 780 and 790 are repeated until second technology wireless signals can be received.

Figure 8:
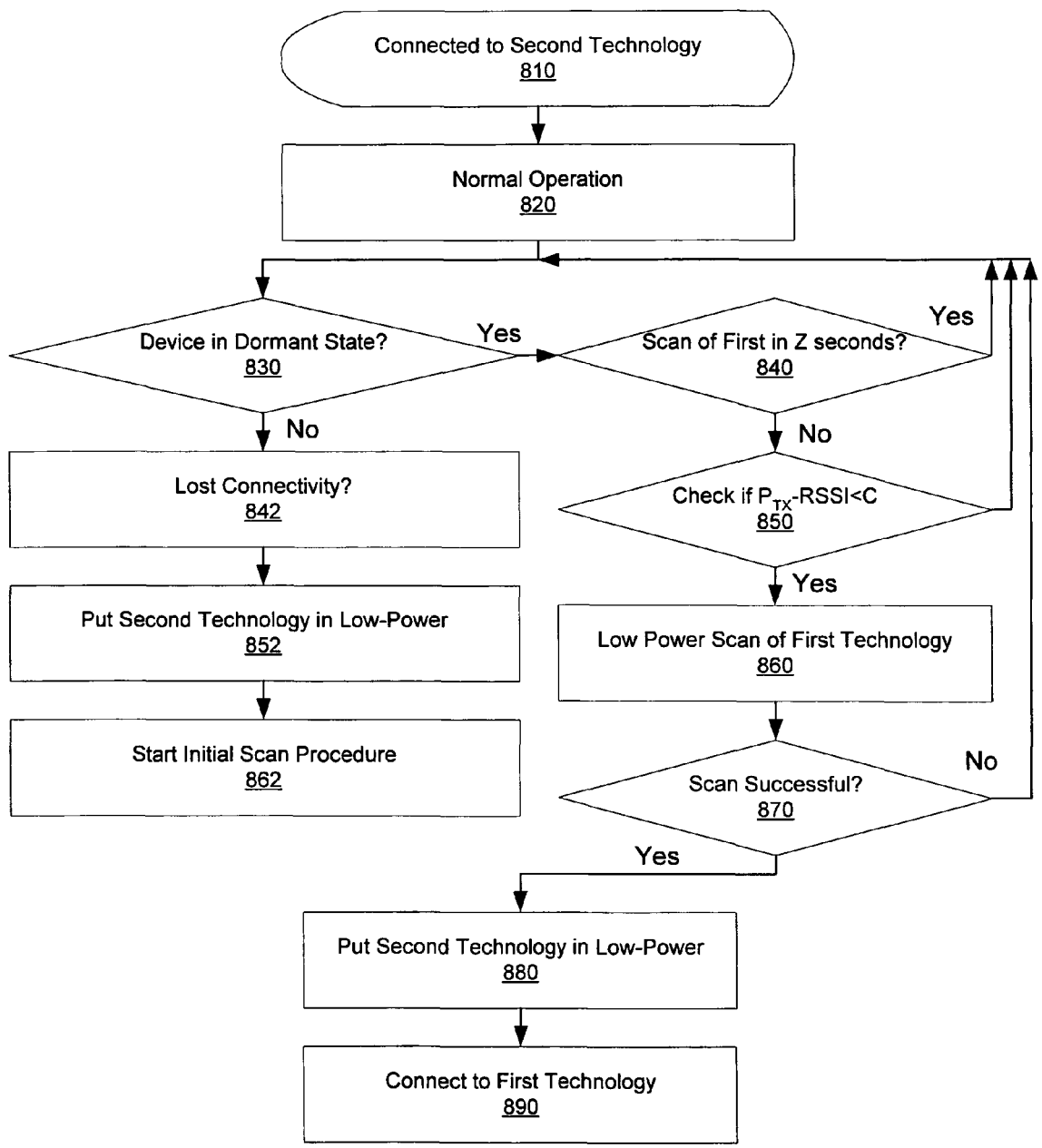
FIG. 8 is a flow chart that includes the steps of an example of a CDMA to WiMAX technology handoff.

FIG. 8 is a flow chart that includes the steps of an example of a method of a mobile subscriber managing a handoff from second technology communication signals (for example, CDMA) to first technology wireless communication signals (such as, WiMAX). A first step 810 includes the wireless subscriber maintaining a connection through a second technology wireless signal to, for example, a second technology base station. A second step 820 includes normal second technology operations, such as, traffic and handoff communications. A third step 830 includes determining whether the subscriber is in a dormant state. This can be very useful, because a transition of the subscriber from the second technology to the first technology can be much more user-friendly if it occurs during a down time (dormant state), in which no communications are occurring. That is, when the subscriber is not currently communicating with, for example, a base station through second technology wireless communication signals. A fourth step 840 includes checking how long it has been since a scan of the availability of first technology signals has been initiated. The fourth step is cycled through until a threshold amount of time (Z) is exceeded. Once exceeded, a fifth step 850 is executed that includes checking whether the signal quality of the first technology signals is good enough. More specifically, an embodiment includes determining if a difference between a transmit signal power and an RSSI (receive signal strength indicator) is less than a threshold C. The greater the RSSI, the better the signal quality of the received first technology wireless signals. If the signal quality is good enough, a sixth step 860 includes performing a low-power scan of the first technology signals. If the scan of the sixth step 860 is successful, a seventh step 870 includes determining whether a second technology search was successful. If yes, an eighth step 880 includes the subscriber putting the second technology radio in low-power mode, and a ninth step 890 includes the subscriber wirelessly connecting to, for example, a base station using first technology wireless signals. An alternate direction from third step 830, includes a tenth step 842 that includes the subscriber losing connectivity of the second technology wireless signals. An eleventh step 852 includes the subscriber putting a second technology radio in a low-power mode. A twelfth step 862 includes the subscriber initiating a scan procedure including first scanning for first technology signals, and then scanning for second technology signals.

Although specific embodiments have been described and illustrated, the embodiments are not to be limited to the specific forms or arrangements of parts so described and illustrated.

What is claimed:

1. A method of a wireless subscriber unit triggering an inter-technology handoff, comprising:
   estimating a signal quality of first technology communication signals received from a serving base station;
   receiving information of neighboring base stations from the serving base station;
   based on the information of the neighboring base stations, estimating a signal quality of first technology communication signals received from each of the neighboring base stations; and
   triggering an inter-technology handoff based on a function of the signal quality of the first technology communication signals received from the serving base station and the signal quality of the first technology communication signals received from each of the neighboring base stations.

2. The method of claim 1, wherein triggering the inter-technology handoff based on the function of the signal quality of the first technology communication signals received from the serving base station and the signal quality of the first technology communication signals received from each of the neighboring base stations comprises;
   triggering the inter-technology handoff if the signal quality of the first technology communication signals received from the serving base station and the signal quality of the first technology communication signals received from each of the neighboring base stations all fall below a predetermined threshold.

3. The method of claim 1, wherein the signal quality includes at least one of CINR (carrier to interference and noise ratio) and RSSI (received signal strength indicator).

4. The method of claim 1, wherein the received communication signals are multi-carrier signals, and the estimated signal quality of the communication signals includes an averaging of a CINR (carrier to interference and noise ratio) of sub-carriers of the received communication signals.

5. The method of claim 4, wherein the CINR of the sub-carriers are averaged over frequency of a single multi-carrier symbol of the received communication signals.

6. The method of claim 4, wherein the CINR of the sub-carriers are averaged over time for multiple multi-carrier symbols of the received communication signals.

7. The method of claim 4, wherein the CINR of the sub-carriers are averaged over at least one of time and frequency for multiple multi-carrier symbols received over spatially separate antennas of the wireless subscriber.

8. The method of claim 1, further comprising:
   de-activating a first technology radio if the inter-technology handoff is triggered.

9. The method of claim 1, further comprising:
   estimating a time (t) of how much longer first technology communication signals can be received when the inter-technology handoff is triggered.

10. The method of claim 9, further comprising:
    activating a second technology radio within the estimated time (t).

11. The method of claim 9, wherein the estimated time (t) is dependent upon a value of a predetermined threshold.

12. The method of claim 11, wherein the estimated time (t) is determined by accessing a look up table, wherein values within the look up table are based upon an averaging parameter used for averaging a signal quality of received signals.

13. The method of claim 1, further comprising:
controlling de-activation of a first technology radio; and
controlling activation of a second technology radio,
wherein timing of the de-activation and the activation is controllable by a connection manager depending upon an amount of expected time the first technology signals can be received, and upon a time required by the second technology radio to scan for second technology wireless communication signals.

14. The method of claim 13, wherein an estimate of the time required by the second technology to scan for second technology wireless communication signals comprises determining how long it has been since second technology wireless communication signals were last received by the wireless subscriber.

15. The method of claim 11, wherein the predetermined threshold is adaptively selected based upon movement of the wireless subscriber.

16. The method of claim 15, wherein the movement of the wireless subscriber is estimated based upon a Doppler shift.

17. A wireless subscriber, comprising:
a first wireless technology radio configured to receive first technology communication signals;
a second wireless technology radio configured to receive second technology communication signals;
a controller configured to estimate a signal quality of first technology communication signals received from a serving base station;
the controller configured to receive information of neighboring base stations from the serving base station;
based on the information of the neighboring base stations, the controller configured to estimate a signal quality of first technology communication signals received from each of the neighboring base stations; and
means for triggering an inter-technology handoff based on a function of the signal quality of the first technology communication signals received from the serving base station and the signal quality of the first technology communication signals received from each of the neighboring base stations.

18. The wireless subscriber of claim 17, wherein triggering the inter-technology handoff based on the function of the signal quality of the first technology communication signals received from the serving base station and the signal quality of the first technology communication signals received from each of the neighboring base stations comprises triggering the inter-technology handoff if the signal quality of the first technology communication signals received from the serving base station and the signal quality of the first technology communication signals received from each of the neighboring base stations, all fall below a predetermined threshold.

19. The wireless subscriber of claim 17, further comprising:
a connection manager configured to control de-activation of the first technology radio, and controlling activation of a second technology radio, where timing of the de-activation and the activation is controllable by the connection manager depending upon an amount of expected time the first technology signals can be received, and upon a time required by the second technology radio to scan for second technology wireless communication signals.

20. The wireless subscriber of claim 17, wherein the received communication signals are multi-carrier signals, and the estimated signal quality of the communication signals includes an averaging of a CINR (carrier to interference and noise ratio) of sub-carriers of the received communication signals.

* * * * *